(12) United States Patent
Karve et al.

(10) Patent No.: US 10,793,188 B2
(45) Date of Patent: Oct. 6, 2020

(54) HIGH BANDWIDTH UNIVERSAL ELECTRIC STEERING SYSTEM CONTROLLER

(71) Applicant: STEERING SOLUTIONS IP HOLDING CORPORATION, Saginaw, MI (US)

(72) Inventors: Harshwardhan D. Karve, Midland, MI (US); Jens Dittmer, Munich (DE); Anthony J. Champagne, Saginaw, MI (US)

(73) Assignee: Steering Solution IP Holding Corporation, Saginaw, MI (US)

( * ) Notice: Subject to any disclaimer, the term of this patent is extended or adjusted under 35 U.S.C. 154(b) by 320 days.

(21) Appl. No.: 15/861,114

(22) Filed: Jan. 3, 2018

(65) Prior Publication Data

US 2019/0202498 A1    Jul. 4, 2019

(51) Int. Cl.
| | |
|---|---|
| *B62D 6/10* | (2006.01) |
| *B62D 6/00* | (2006.01) |
| *B62D 5/04* | (2006.01) |
| *H02P 21/22* | (2016.01) |
| *G05B 19/427* | (2006.01) |

(52) U.S. Cl.
CPC ............. *B62D 6/10* (2013.01); *B62D 5/0463* (2013.01); *B62D 5/0472* (2013.01); *B62D 5/0481* (2013.01); *B62D 6/008* (2013.01); *G05B 19/427* (2013.01); *H02P 21/22* (2016.02)

(58) Field of Classification Search
CPC ...... B62D 6/10; B62D 5/0463; B62D 5/0472; B62D 5/0481; B62D 6/008; H02P 21/22; G05B 19/427
USPC .......................................... 180/443, 444, 446
See application file for complete search history.

(56) References Cited

U.S. PATENT DOCUMENTS

2015/0375780 A1* 12/2015 Chai ...................... B62D 6/008
                                                              701/41

* cited by examiner

*Primary Examiner* — Jacob D Knutson
(74) *Attorney, Agent, or Firm* — Dickinson Wright PLLC (57) ABSTRACT

Technical solutions are described for generating and providing a motor torque command in electric systems such as an electric power steering (EPS) system. For example, an example EPS system includes a motor, and a controller that operates the motor to generate torque. The controller determines a torque reference twist based on a torque reference. The controller further determines a motor angle reference twist based on an angle-difference by multiplying the angle-difference by an autonomous mode enable signal. The autonomous mode enable signal is indicative whether the EPS is operating in autonomous mode. The controller further computes a total reference twist based on the torque reference twist and the motor angle reference twist, and computes a motor angle reference based on the total reference twist and a handwheel angle. The controller further generates the motor torque command using the motor angle reference, and sends the motor torque command to the motor.

20 Claims, 6 Drawing Sheets

HIGH BANDWIDTH UNIVERSAL ELECTRIC STEERING SYSTEM CONTROLLER

TECHNICAL FIELD

The present application generally relates to electric power steering (EPS) systems, and particularly to EPS systems that operate in multiple operating modes such as position control mode, torque control mode, velocity control mode, and so on.

BACKGROUND

An electric power steering (EPS) system may be operated in different operating modes for variety of steering functions and applications. For example, during human operator driving a vehicle, the EPS may operate in torque control mode. Additionally, during autonomous driving, or automatic parking or any other such autonomous operations, the EPS may be operated in position control mode.

Transitioning from one operating mode of the vehicle to another during driving the vehicle (e.g.: human-driver, autonomous, semi-autonomous), leads to the EPS transitioning from one operating mode to another. Typically, the EPS includes a separate module for each operating mode of the EPS. There are considerable variations in the EPS mechanical design as well as software design for the different operating modes in terms of motor inertia, hand wheel inertia, and stiffness in the system. However, transitioning from one operating mode to another can cause delay and moreover discomfort for the operator, and further yet, tuning efforts for each control module for the respective operating mode.

Accordingly, it is desirable to have a single control module that operates the EPS regardless of the operating mode being position control for autonomous driving or torque control for human operator driving.

SUMMARY

Technical solutions are described for generating and providing a motor torque command in electric systems such as an electric power steering (EPS) system. For example, an example EPS system includes a motor, and a controller that operates the motor to generate torque. The controller determines a torque reference twist based on a torque reference. The controller further determines a motor angle reference twist based on an angle-difference by multiplying the angle-difference by an autonomous mode enable signal. The autonomous mode enable signal is indicative whether the EPS is operating in autonomous mode. The controller further computes a total reference twist based on the torque reference twist and the motor angle reference twist, and computes a motor angle reference based on the total reference twist and a handwheel angle. The controller further generates the motor torque command using the motor angle reference, and sends the motor torque command to the motor.

According to one or more embodiments, a method for providing a motor torque command to a motor of a steering system includes determining a torque reference twist based on a torque reference. The method further includes determining a motor angle reference twist based on an angle-difference by multiplying the angle-difference by an autonomous mode enable signal, the autonomous mode enable signal indicative that the steering system is operating in autonomous mode. The method further includes computing a total reference twist based on the torque reference twist and the motor angle reference twist. The method further includes computing a motor angle reference based on the total reference twist and a handwheel angle. The method further includes generating the motor torque command to be applied to the motor using the motor angle reference.

According to one or more embodiments, a motor control system applies a motor torque command to a motor of a steering system to generate torque. The motor control system determines a torque reference twist based on a torque reference. The motor control system further determines a motor angle reference twist based on an angle-difference by multiplying the angle-difference by an autonomous mode enable signal, the autonomous mode enable signal indicative that the steering system is operating in autonomous mode. The motor control system further computes a total reference twist based on the torque reference twist and the motor angle reference twist. The motor control system further computes a motor angle reference based on the total reference twist and a handwheel angle. The motor control system further generates the motor torque command to be applied to the motor using the motor angle reference.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
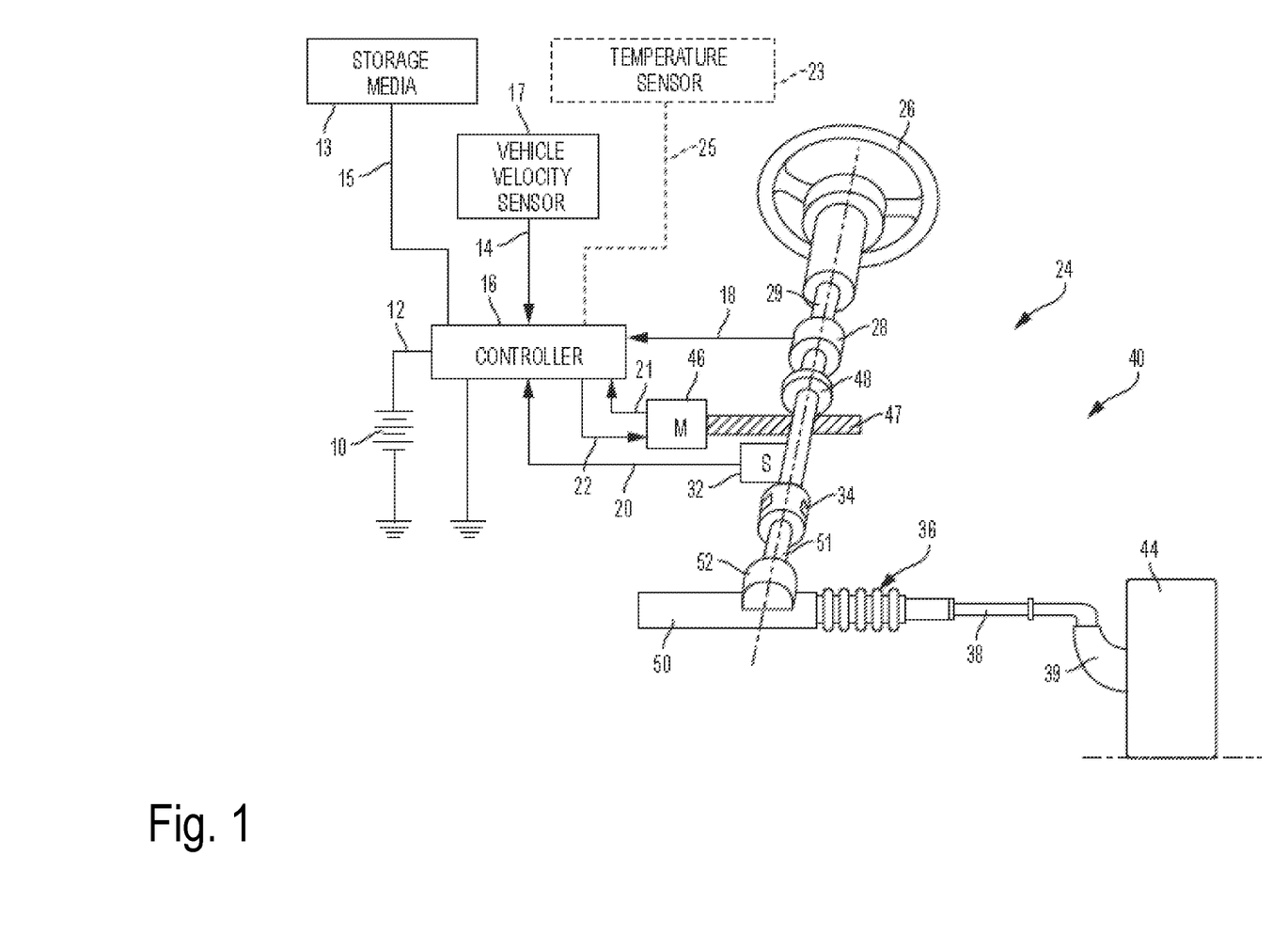
FIG. 1 is an exemplary embodiment of an electric power steering system (EPS) 40 according to one or more embodiments.

Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 46, which could be a motor, such as a brushed motor, a permanent magnet synchronous motor (PMSM), or any other type of motor, and is hereinafter denoted as motor 46. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the corresponding voltage(s) out of inverter (not shown), which may optionally be incorporated with controller 16 and will be referred to herein as controller 16, such that, when applied to the motor 46, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 46 and the desired torque, the position and/or speed of the rotor and the torque applied by an operator are determined. A position encoder is connected to the steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

Figure 2:
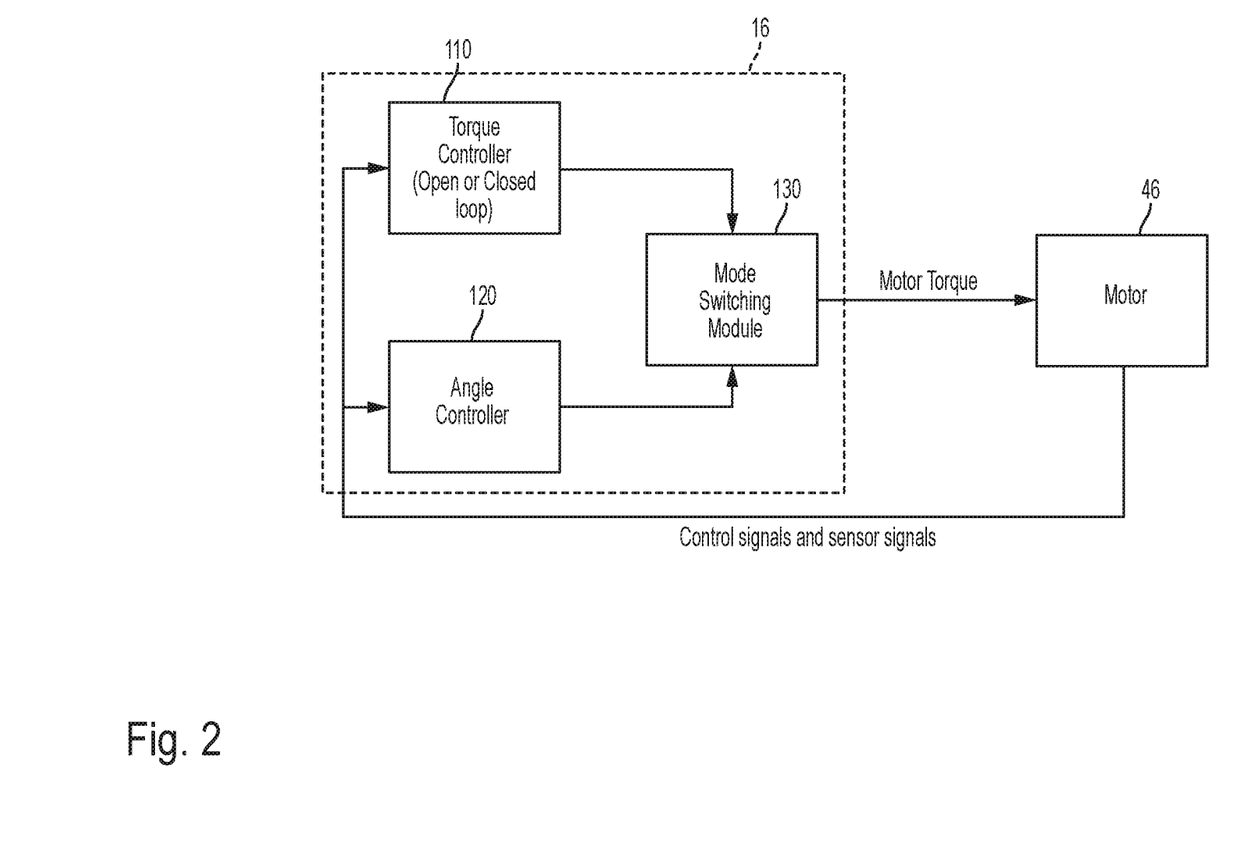
FIG. 2 depicts a block diagram of an example controller according to one or more embodiments.

FIG. 2 depicts a block diagram of an example controller according to one or more embodiments. The controller 16 receives one or more input signals, such as control and sensor signals from the one or more sensors in the steering system 40. The controller 16, in response computes a motor torque that is to be generated by the motor 46 of the steering system 40, and sends the motor 46 in the form of a command, such as a torque command, current command, voltage command, or a combination thereof.

Typically, the controller 16 used in the steering system 40 includes at least two control units, a torque controller 110 and an angle controller 120, for controlling the steering system 40 in different operating modes of the vehicle 10. The torque controller 110 may be an open loop torque controller or a closed loop torque controller. The open and/or closed loop torque controller 110 generates the torque command to control driver torque for non-autonomous steering mode, which is the torque control mode. The angle controller 120 generates the torque command to control vehicle direction for autonomous steering mode, which is the position control mode.

Each of the torque controller 110 and the angle controller 120 is tuned separately. Further, the controller 16 includes a mode switching module 130 that switches between the torque controller 110 and the angle controller 120 based on if a driver is intervening in controlling the vehicle 10, for example by intervening during autonomous driving. In one or more examples, the torque controller 110 and the angle controller 120, each using the data from the sensors, perform computations to generate respective motor torque commands. The mode switching module selects the final motor torque command that is sent to the motor 46 from the two motor torque commands from the at least two controllers. It should be noted that in other examples, the controller 16, in addition to the torque controller 110 and the angle controller 120, includes additional controllers that generate corresponding motor torque commands that the mode switching module 130 selects from to send the final motor torque command to the motor 46.

Using such multiple controller units within the controller 16, in addition to increasing hardware, software, and other components, also require each of the components to be separately tuned, increasing the costs. Further, during operation of the steering system 40, the mode switching from one controller to another may cause a delay and/or discomfort as the driver may have to apply additional force when switching from position control mode (autonomous) to the torque control mode (non-autonomous).

This technical solutions described herein address such technical challenges, and eliminate using different controllers, switching, and control tunings by using a single universal controller.

Figure 3:
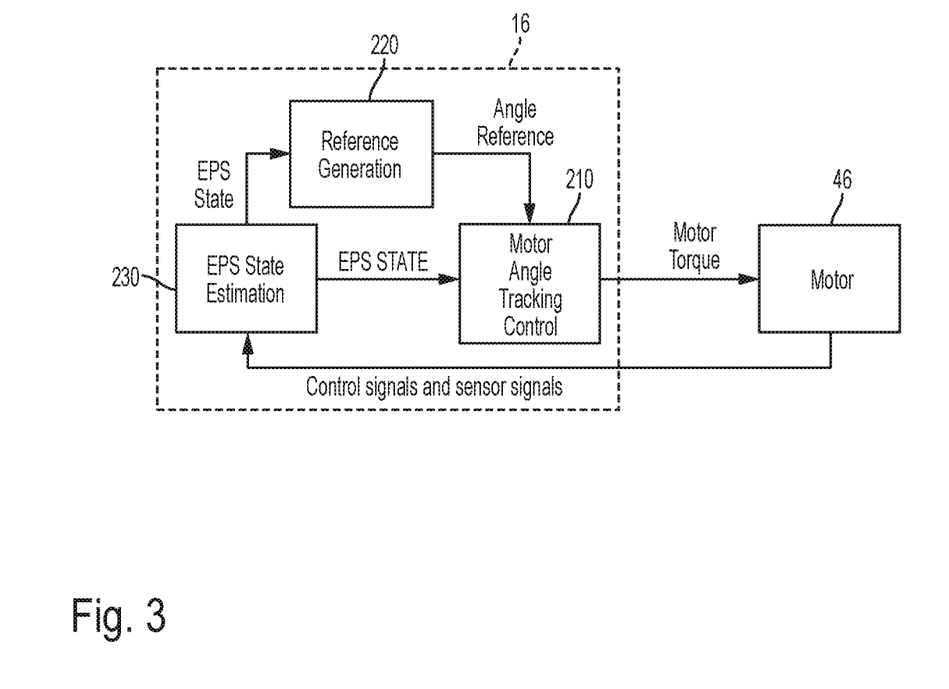
FIG. 3 depicts a block diagram of an example controller according to one or more embodiments.

FIG. 3 depicts a block diagram of an example controller according to one or more embodiments. The controller 16B includes a motor angle tracking module 210, which is the only module that is to be tuned for closed loop angle and torque control. The reference generator 220 blends angle reference and torque reference computation. Further, the controller 16B includes an EPS state estimation module 230 that estimates EPS states based on sensor input data. The state estimation may be performed using one or more available state estimation techniques, such as linear quadratic estimation. For example, linear quadratic estimation may be used to estimate one or more of motor angle, motor velocity, Tbar relative angle, Tbar relative velocity, motor torque, driver torque, rack force, and the like or a combination thereof.

The estimated state from the EPS state estimation module 230 are used by both the reference generator 220 and the motor angle tracking control module 210 to generate the motor torque command that is used to control the motor 46. The motor angle tracking control module 210 generates the motor torque command using the motor estimated state and a motor angle reference computed by the reference generator 220. In one or more examples, the motor angle tracking control module 210 generates the motor torque command using linear quadratic Gaussian (LQG) control techniques, or any other technique using linear dynamic feedback, and/or partial state feedback. The LQG control may use a linear-quadratic regulator (LQR) that uses the estimated states from the linear-quadratic estimator (LQE) 230, using Kalman filtering.

It should be noted that although the figures and embodiments described herein illustrate and describe controlling the motor 46, the motor command generated by the controller 16 is used to control other components of the steering system 40 such as mechanical steering actuator, chassis hardware, and the like or a combination thereof.

Figure 4:
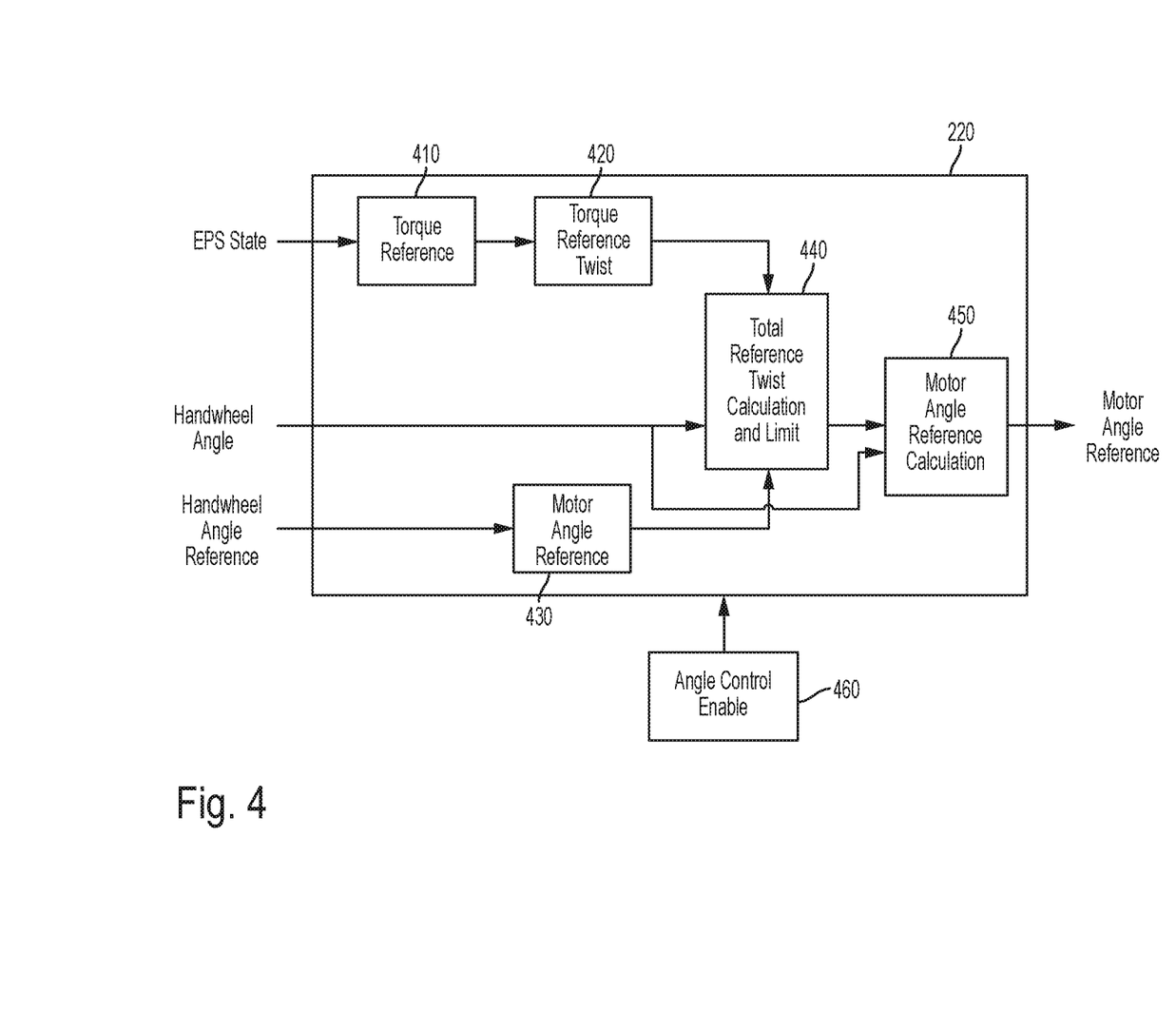
FIG. 4 depicts a block diagram of an example reference generator according to one or more embodiments.

FIG. 4 depicts a block diagram of an example reference generator according to one or more embodiments. The reference generator 220 includes, among other components, a torque reference generator 410, a torque reference twist module 420, a motor angle reference generator 430, a total reference calculation and limit module 440, and a motor angle reference calculation module 450. A reference torque value generated by the torque reference generator 410 is used by the remaining modules listed above to determine a motor angle reference value that is input to the motor angle tracking control module 210.

The torque reference generator 410 uses the EPS state inputs and vehicle inputs (not shown) to generate a reference torque. The reference torque is computed as a function of vehicle speed and rack force, for example, to determine the driver effort in situations when ~~there~~ angle reference control is not being used (non-autonomous driving). In other examples, vehicle inputs other than the vehicle speed and rack force may be used for determining the driver effort. The driver effort is represented as a torque value generated by the computations performed by the reference torque generator 410.

The torque reference twist module 420 computes a reference twist angle corresponding to the reference torque value from the reference torque generator 410. Consider that measured torque that is applied by the operator to the steering wheel 26 is obtained in the vehicle 10 by measuring angles above and below a torsion bar (Tbar) reference position, such as a predetermined center position of the steering wheel 26. The applied driver torque is then calculated as the difference between the angles multiplied by Tbar stiffness, the stiffness being a predetermined value for the steering system 40.

$$\text{Driver Torque} = \text{Tbar Stiffness} \times (\text{angle difference}).$$

The difference angle above (and below) the Tbar can be estimated as the difference between steering handwheel angle (HwAngle) and motor angle (MtrAngle, in steering coordinates). Thus, the above calculation can be expressed as:

Driver Torque=Tbar Stiffness×(HwAngle−MtrAngle).

Both, the HwAngle and the MtrAngle are available as estimated states received from the EPS state estimation module 230. The torque reference twist module 420 computes the reference twist angle that is derived from the reference torque as:

Torque Reference Twist=(Driver Torque Reference/Tbar Stiffness).

The motor angle reference generator 430 computes a motor angle reference value based on a handwheel angle of the steering wheel 26 measured by one or more sensors. Alternatively, the motor angle reference value may be based on one or more sensors used to determine the motor position. The motor angle reference value is generated using scaling and rate limiting of the handwheel angle and/or the motor position.

The total reference twist calculation and limit module 440 receives the reference twist angle from the torque reference twist module 420 and the motor angle reference the motor angle reference generator 430. The total reference twist calculation and limit module 440 further receives the handwheel angle. In the absence of angle control (autonomous operating mode), the total reference twist calculation and limit module 440 tracks the reference twist angle and provides a closed loop control to the reference torque generated by the torque reference generator 410. In addition, the total reference twist calculation and limit module 440 tracks the reference angle by inclusion of both the motor angle reference (in steering coordinates) and the handwheel angle. For example, the total reference twist calculation and limit module 440 computes the:

Total Reference Twist=Torque Reference Twist+Motor Angle Reference−Handwheel Angle.

Further, for optimizing driver comfort, the total reference twist that is computed is limited to a predetermined limiting value by the total reference twist calculation and limit module 440.

The reference generator 220 receives an angle control enable control signal depending on whether the driver is controlling the steering wheel 26 or if the driver intervenes in the operation of the autonomous control. The angle control enable signal is FALSE in non-autonomous mode (if the driver is controlling the steering wheel 26), and TRUE in autonomous mode. The computation for the total reference twist is changed based on the angle control enable control signal. For example, in non-autonomous mode, the total reference twist does not use the (Motor Angle Reference−Handwheel Angle), and uses the value (as in the above equation) in autonomous mode. In one or more examples, the angle control enable signals is multiplied with the input (Motor Angle Reference−Handwheel Angle) prior to an addition module that computes the total reference twist. Hence, no switching logic/module is required for switching the controller being used based on the operating mode, because the computations performed incorporate the current operating mode as an input data/signal.

The motor angle reference calculation module 450 computes a final motor angle reference that is input to the motor angle tracking control module 210 using the total reference twist angle and the handwheel angle. In one or more examples, the computation is as follows:

Motor Angle Reference=Handwheel Angle−Total Reference Twist (Limited).

Figure 5:
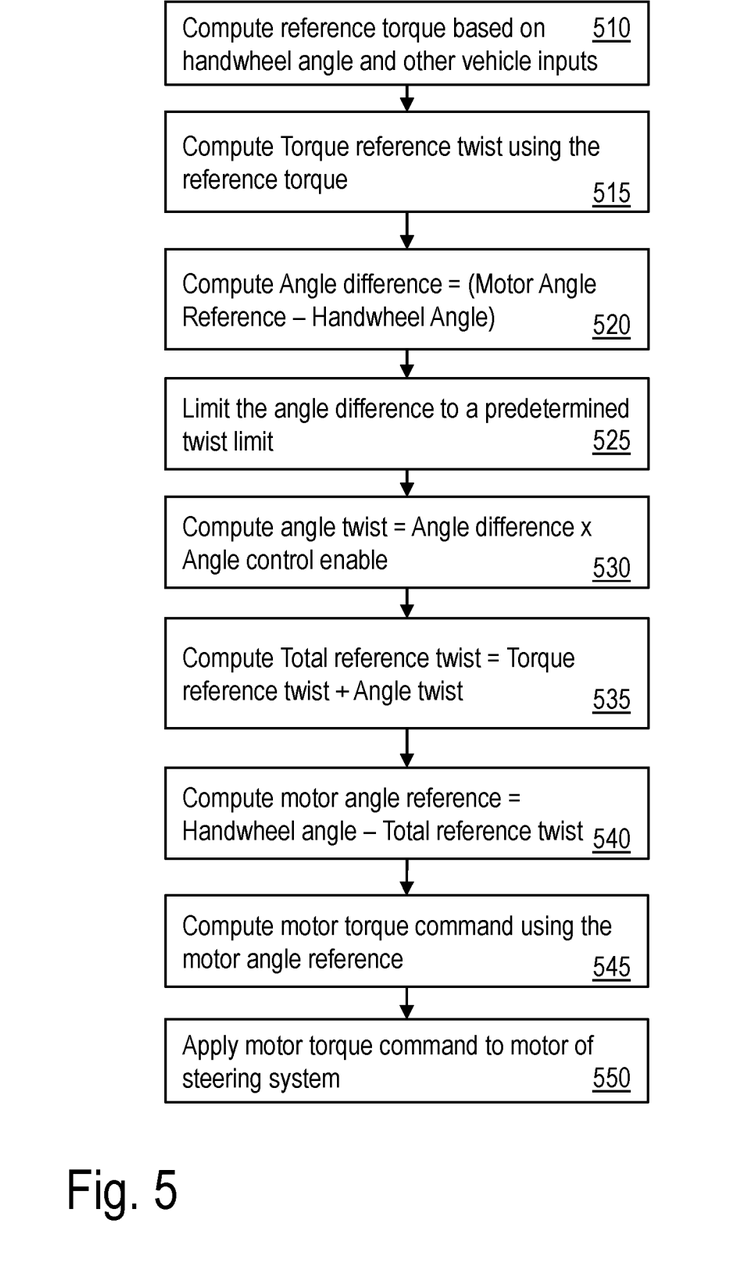
FIG. 5 depicts a flowchart of an example method for using the single controller for both, position and angle control together according to one or more embodiments.

FIG. 5 depicts a flowchart of an example method for using the single controller for both, position and angle control together according to one or more embodiments. The method includes computing a torque reference value based on steering wheel 26 angle (handwheel angle) and other vehicle inputs such as vehicle speed, and the like, as shown at block 510. The method further includes computing the torque reference twist based on the torque reference using a Tbar stiffness parameters, which may be a predetermined constant, or a value that is measured using one or more sensors, as shown at block 515.

Further, the method includes computing the angle difference between the handwheel angle and the motor angle, as shown at block 520. In one or more examples, the difference is limited to a predetermined twist limit, as shown at block 525.

The method further includes multiplying the limited angle difference with the angle control enable value 460 to determine an angle twist, as shown at block 530. If the steering system is operating in autonomous mode, the angle enable signal is TRUE (1) and hence the angle twist represents the limited angle difference; else, if the steering system is operating in non-autonomous mode, the angle enable signals is FALSE (0) and hence the angle twist results in zero (0). Thus, the computations in this case incorporate the autonomous/non-autonomous operating modes, without requiring extra tuning of separate controller units and further without switching between different controller units for the different operating modes.

The method further includes computing the total reference twist=Torque reference twist+angle twist. In the non-autonomous mode the angle twist is zero and thus has no impact on the total reference twist result, as shown at block 535.

Further, the motor angle reference is computed using the handwheel angle and the total reference twist, Motor Angle Reference=Handwheel Angle−Total Reference Twist, as shown at block 540.

The motor angle reference is further forwarded to the motor angle tracking control module 230. The motor angle tracking control module 230 generates a motor torque command for the motor 46 using the motor angle reference and one or more estimated EPS states, as shown at block 545. For example, the motor torque command may be generated using LQG or other techniques. The motor torque command is then sent to the motor 46 (and other components) to control the amount of torque being applied by the steering system 40, as shown at block 550.

Figure 6:
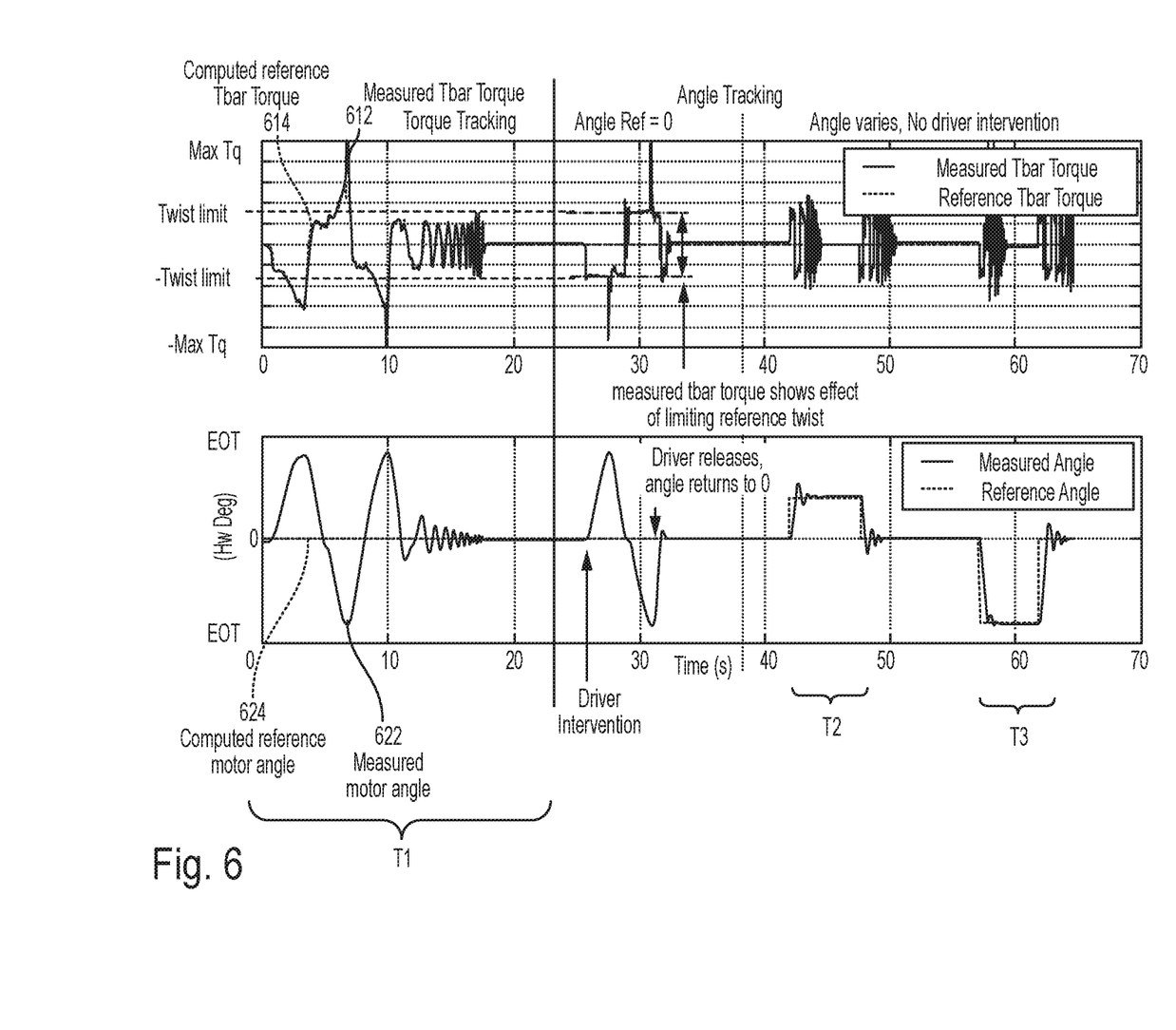
FIG. 6 depicts an example scenario of using a single controller for both, position control and angle control, together, according to one or more embodiments.

FIG. 6 depicts an example scenario of using the single controller 16B for both, position and angle control together according to one or more embodiments. In FIG. 6, plot 610 depicts a measured Tbar torque 612 and reference torque 614 output by the torque reference generator 410. Further, plot 620 depicts a measured angle 622 and motor reference angle 624 as computed by the reference generator 220.

In the example scenario depicted, the controller 16B is operating in non-autonomous mode for a duration of time T1 (23 seconds in this example), and hence the controller 16B is tracking a torque reference only (angle tracking not active). In the depicted example, as shown by line 622, during the duration T1, the operator moves the steering wheel 26 to end of travel (+EOT, which is a predetermined value) in one direction, for example clockwise, and further to the end of travel in the other direction, say counterclockwise (−EOT), followed by increasing frequency steering back and forth on center. Correspondingly, in plot 610, the measured Tbar torque 612 tracking matches the reference torque computed 614, with the exception of the end of travel conditions. In this mode, the controller 16B does not use the angle tracking. The controller 16B determines bypassing the angle tracking in response to detecting and/or receiving a signal indicative of the operator holding, or contacting the steering wheel 26. In one or more examples, one or more sensors are associated with the steering wheel 26 to detect if the operator is in contact with the steering wheel 26.

Referring back to FIG. 6, consider that the vehicle 10 and consequently the steering system 40 shifts to autonomous driving mode, and hence angle control mode at the end of the first duration T1. Accordingly, the controller 16B uses the modules 420, 430, 440, and 450 to perform angle tracking in addition to torque tracking. In the ongoing example, consider that a driver intervention occurs in the autonomous driving condition at substantially the 25 second mark, and the driver maneuvers the steering wheel 26 back and forth to end of travel, in the presence of angle control active and motor reference angle set to 0 degrees.

The controller 16B facilitates the driver to take over control from angle control mode and steer to end of travel without switching from one operating mode to another because of the torque tracking and angle tracking being part of the single controller 16B. Further, the effect of twist limiting, set to a predetermined range (±Twist Limit), can be seen in the measured Tbar torque 612 corresponding to such an intervening maneuver. The twist limit ensures that the while the driver is working against angle control (which is moving the steering wheel 26 to the center), driver effort is limited to a comfortable level as per the predetermined twist limits.

Further, when the driver releases the steering wheel 26 (the measured Tbar torque 612 going to substantially 0), the controller 16B uses the angle control to return the motor angle reference to 0 degrees in this case.

The plots 610 and 620 further illustrate that without driver intervention the controller 16B applies only angle tracking, without torque tracking, as can be seen in the reference angle curve (622) to change the motor reference angle automatically, for example in the timespan 42 to 48 seconds (T2), and similarly, the motor reference angle switches between 57 and 62 seconds (T3).

The technical solutions described herein thus improve a steering system, and particularly a controller for a motor of the steering system by eliminating separate control units to be used for different operating modes, such as angle/position control, torque control etc. The technical solutions described herein facilitate adding together torque-based angle command with angle command generated by autonomous driver (in angle control) irrespective of the operating mode. The improvements improve the angle tracking bandwidth and the torque control bandwidth of the controller.

Further, the technical solutions described herein eliminate tuning the separate control units, and thus using multiple separate sets of tuning parameters specific to the different operating modes. Instead, by incorporating the state of the operating mode in the computations performed for determining a motor command for operating the motor, the technical solutions described herein facilitate a single controller to operate universally across multiple operating modes without switching logic and/or using different tuning parameters.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. An electric power steering (EPS) system that provides a motor torque command, the EPS system comprising:
   a motor; and
   a controller configured to generate and send the motor torque command to the motor to generate torque, the controller configured to:
      determine a torque reference twist based on a torque reference;

determine a motor angle reference twist based on an angle-difference by multiplying the angle-difference by an autonomous mode enable signal, the autonomous mode enable signal indicative that the EPS is operating in autonomous mode;

compute a total reference twist based on the torque reference twist and the motor angle reference twist;

compute a motor angle reference based on the total reference twist and a handwheel angle; and generate the motor torque command using the motor angle reference, and send the motor torque command to the motor.

2. The electric power steering (EPS) system of claim 1, wherein the controller is further configured to compute the torque reference based on the handwheel angle.

3. The electric power steering (EPS) system of claim 1, wherein the torque reference twist is computed by dividing the torque reference by a Tbar-stiffness value associated with the EPS.

4. The electric power steering (EPS) system of claim 1, wherein the controller is further configured to compute the angle-difference as a difference between the handwheel angle and a motor angle.

5. The electric power steering (EPS) system of claim 4, wherein the controller limits the angle-difference to a predetermined threshold twist limit value.

6. The electric power steering (EPS) system of claim 1, wherein the motor angle reference is computed by subtracting the total reference twist from the handwheel angle.

7. The electric power steering (EPS) system of claim 1, wherein the total reference twist is computed by adding the torque reference twist and the motor angle reference twist.

8. The electric power steering (EPS) system of claim 1, wherein the autonomous mode enable signal is a binary signal that is TRUE when the EPS is being operated in autonomous mode and FALSE when the EPS is being operated in non-autonomous mode.

9. A method for providing a motor torque command to a motor, the method comprising:

determining a torque reference twist by a controller based on a torque reference;

determining a motor angle reference twist by the controller based on an angle-difference by multiplying the angle-difference by an autonomous mode enable signal, the autonomous mode enable signal indicative that the motor is operating in autonomous mode;

computing a total reference twist by the controller based on the torque reference twist and the motor angle reference twist;

computing a motor angle reference by the controller based on the total reference twist and a handwheel angle; and generating, by the controller, the motor torque command to be applied to the motor using the motor angle reference.

10. The method of claim 9, further comprising computing the torque reference based on the handwheel angle.

11. The method of claim 9, wherein the torque reference twist is computed by dividing the torque reference by a Tbar-stiffness value associated with the motor.

12. The method of claim 9, further comprising computing the angle-difference as a difference between the handwheel angle and a motor angle.

13. The method of claim 12, further comprising limiting the angle-difference to a predetermined threshold twist limit value.

14. The method of claim 9, wherein the motor angle reference is computed by subtracting the total reference twist from the handwheel angle.

15. The method of claim 9, wherein the total reference twist is computed by adding the torque reference twist and the motor angle reference twist.

16. A motor control system configured to apply a motor torque command to a motor to generate torque, the applying of the motor torque command comprising:

determining a torque reference twist by a controller based on a torque reference;

determining a motor angle reference twist by the controller based on an angle-difference by multiplying the angle-difference by an autonomous mode enable signal, the autonomous mode enable signal indicative that the motor is operating in autonomous mode;

computing a total reference twist by the controller based on the torque reference twist and the motor angle reference twist;

computing a motor angle reference by the controller based on the total reference twist and a handwheel angle; and generating, by the controller, the motor torque command to be applied to the motor using the motor angle reference.

17. The motor control system of claim 16, wherein the torque reference twist is computed by dividing the torque reference by a Tbar-stiffness value.

18. The motor control system of claim 16, further configured to compute the angle-difference as a difference between the handwheel angle and a motor angle.

19. The motor control system of claim 18, further configured to limit the angle-difference to a predetermined threshold twist limit value.

20. The motor control system of claim 16, wherein the motor angle reference is computed by subtracting the total reference twist from the handwheel angle.

* * * * *